(No Model.)

E. M. HILL.
NUT LOCK.

No. 472,706. Patented Apr. 12, 1892.

UNITED STATES PATENT OFFICE.

ELIAS M. HILL, OF PITTSBURG, PENNSYLVANIA, ASSIGNOR OF ONE-HALF TO HENRY BRADLY, OF SAME PLACE.

NUT-LOCK.

SPECIFICATION forming part of Letters Patent No. 472,706, dated April 12, 1892.

Application filed January 7, 1891. Serial No. 377,032. (No model.)

*To all whom it may concern:*

Be it known that I, ELIAS M. HILL, a citizen of the United States, residing at Pittsburg, in the county of Allegheny and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

My invention relates to an improved nut-locking device; and it consists in a plate of sheet metal, one portion of which acts as a washer and the other as a means of locking the nut, together with certain details of construction, as will be fully set forth hereinafter.

Figure 1:
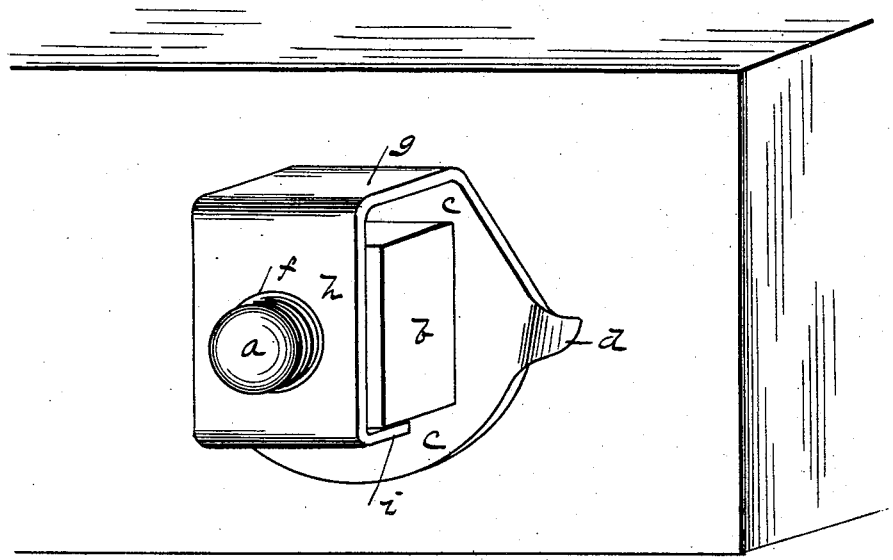
Figure 2:
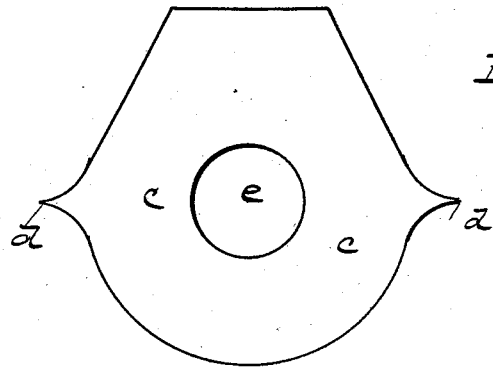

In the accompanying drawings, Figure 1 is a perspective view of my improved nut-locking device, showing the same in operation. Fig. 2 is a rear face view of my improvement.

To put my invention into practice with a bolt $a$ and nut $b$, I provide a suitable plate and form one portion $c$ of the same into a broad washer having an opening $e$ to permit the bolt $a$ to pass through and with two barbs $d$ at its sides, which will force themselves into the substance against which it is placed, and thereby prevent the same from turning. Integral with this washer $c$ and at right angles to the barbs is an oblong piece $g$, provided with an opening $f$ to fit over that portion of the bolt $a$ projecting beyond the nut $b$. This oblong portion $g$ is bent at right angles to the washer $c$, then a portion $h$ made parallel with the same, and the extremity $i$ bent beneath the lower side of the nut $b$, thus effectually locking the nut $b$.

Having thus described my invention, I claim—

As as improved article of manufacture, the herein-described device for locking nuts, consisting of the broad base-washer $c$, having an opening for the passage of the bolt and formed at its opposite sides with the barbs $d$, and the oblong piece extending from said part $c$ at right angles to the barbs, bent to form the horizontal part $g$, adapted to extend along one side of the nut, the vertical part $h$, adapted to closely engage the outer surface of the nut and formed with an opening for the passage of the bolt, and the horizontal part $i$ for closely engaging the other side of said nut, all substantially as shown and described.

In testimony that I claim the foregoing I hereunto affix my signature this 31st day of May, A. D. 1890.

ELIAS M. HILL. [L. S.]

In presence of—
 CHARLES LARGE,
 M. E. HARRISON.